United States Patent
Nishihama et al.

(10) Patent No.: US 12,191,789 B2
(45) Date of Patent: Jan. 7, 2025

(54) DRIVE SYSTEM

(71) Applicant: Hitachi Construction Machinery Co., Ltd., Tokyo (JP)

(72) Inventors: Kazuo Nishihama, Tokyo (JP); Masatoshi Yoshimura, Tokyo (JP); Kosuke Matsuo, Tokyo (JP); Satoru Kaneko, Tokyo (JP); Tokuma Ikegami, Tsuchiura (JP); Seiji Ishida, Tsuchiura (JP); Toshihiko Watanabe, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 18/025,492

(22) PCT Filed: Feb. 18, 2022

(86) PCT No.: PCT/JP2022/006753
§ 371 (c)(1),
(2) Date: Mar. 9, 2023

(87) PCT Pub. No.: WO2022/209413
PCT Pub. Date: Oct. 6, 2022

(65) Prior Publication Data
US 2023/0370008 A1    Nov. 16, 2023

(30) Foreign Application Priority Data
Mar. 29, 2021 (JP) .................. 2021-054594

(51) Int. Cl.
*H02P 27/06* (2006.01)
*B60L 7/14* (2006.01)
(Continued)

(52) U.S. Cl.
CPC ............... *H02P 27/06* (2013.01); *B60L 7/14* (2013.01); *B60L 15/007* (2013.01); *B60L 50/51* (2019.02); *H02K 11/33* (2016.01)

(58) Field of Classification Search
CPC .......... H02P 27/06; B60L 7/14; B60L 15/007; B60L 50/51
See application file for complete search history.

(56) References Cited

U.S. PATENT DOCUMENTS

| 4,503,377 A * | 3/1985 | Kitabayashi | ........... H02K 17/42 |
| | | | 318/807 |
| 6,407,521 B1 * | 6/2002 | Raftari | ................... B60K 6/445 |
| | | | 318/245 |

(Continued)

FOREIGN PATENT DOCUMENTS

| JP | 6-14600 A | 1/1994 |
| JP | 2005-11058 A | 1/2005 |

(Continued)

OTHER PUBLICATIONS

International Preliminary Report on Patentability (PCT/IB/338 & PCT/IB/373) issued in PCT Application No. PCT/JP2022/006753 dated Oct. 12, 2023, (Japanese-language Written Opinion (PCT/ISA/237), filed on Mar. 9, 2023) (5 pages)

(Continued)

*Primary Examiner* — Rina I Duda
(74) *Attorney, Agent, or Firm* — Crowell & Moring LLP

(57) ABSTRACT

It is an object of the present invention to provide a drive system including an induction generator comprising some primary windings that has a main winding and an auxiliary winding, the drive system being capable of supplying electric power required by an auxiliary inverter, even in a regenerative mode of operation in which only the auxiliary winding is energized. The maximum current value of a converter for power generating is set on the basis of the maximum output power of the auxiliary winding of the induction generator and the minimum voltage applied to the auxiliary winding unless a traction inverter is in a regenerative mode of operation, and the non-load current value of the induction generator is set such that the maximum current in the auxiliary winding under the situation of the traction inverter being in the regenerative mode of operation does not exceed the maximum current in the converter for power generating.

7 Claims, 8 Drawing Sheets

(51) Int. Cl.
*B60L 15/00* (2006.01)
*B60L 50/51* (2019.01)
*H02K 11/33* (2016.01)

(56) References Cited

U.S. PATENT DOCUMENTS

| | | | |
|---|---|---|---|
| 6,617,820 B2* | 9/2003 | Carlson | B60L 15/007 |
| | | | 363/15 |
| 2003/0090225 A1* | 5/2003 | Posma | B60L 50/52 |
| | | | 318/376 |
| 2006/0026101 A1 | 2/2006 | Ogura et al. | |
| 2010/0108419 A1* | 5/2010 | Mari Curbelo | B60L 53/11 |
| | | | 180/65.265 |
| 2014/0062348 A1* | 3/2014 | Isayeva | G05B 9/03 |
| | | | 318/139 |
| 2016/0126740 A1 | 5/2016 | Lu et al. | |

FOREIGN PATENT DOCUMENTS

| | | |
|---|---|---|
| JP | 2016-96714 A | 5/2016 |
| JP | 2018-149882 A | 9/2018 |

OTHER PUBLICATIONS

International Search Report (PCT/ISA/210) issued in PCT Application No. PCT/JP2022/006753 dated May 17, 2022 with English translation (four (4) pages).
Japanese-language Written Opinion (PCT/ISA/237) issued in PCT Application No. PCT/JP2022/006753 dated May 17, 2022 (three (3) pages).

* cited by examiner

DRIVE SYSTEM

TECHNICAL FIELD

The present invention relates to a drive system that uses an induction generator that comprises some primary windings that has a main winding and an auxiliary winding.

BACKGROUND ART

There are known drive systems that use an induction generator that comprises some primary windings that has a main winding and an auxiliary winding.

For example, a generator disclosed in Patent Document 1 has a three-phase winding (corresponding to a main winding) and an excitation-dedicated winding (corresponding to an auxiliary winding) provided separately from the three-phase winding. The three-phase winding is connected to a battery and a drive inverter (corresponding to a traction inverter) through a diode bridge (corresponding to a rectifier). The excitation-dedicated winding is connected to the battery and the drive inverter through an excitation inverter (corresponding to a converter for power generating).

PRIOR ART DOCUMENT

Patent Document

Patent Document 1: JP-H8-79908-A

SUMMARY OF THE INVENTION

Problem to be Solved by the Invention

According to Patent Document 1, the generator has a three-phase winding (corresponding to a main winding) and an excitation-dedicated winding (corresponding to an auxiliary winding) separately. The three-phase winding is connected to the battery and the drive inverter (corresponding to a traction inverter) through the diode bridge (corresponding to a rectifier). However, there is nothing disclosed about a regenerative mode of charging the battery from the drive inverter.

Assuming that operation of charging the battery in the regenerative mode of the drive inverter disclosed in Patent Document 1, the diode bridge is applied with a reverse voltage. Therefore, the three-phase winding is opened, so that the current is not able to flow. Hence, while in the regenerative mode of operation, the three-phase winding side is not energized and only the excitation-dedicated winding side is energized.

It is an object of the present invention to provide a drive system including an induction generator comprising some primary windings that has a main winding and an auxiliary winding, the drive system being capable of supplying electric power required by some auxiliary inverters, even in a regenerative mode of operation in which only the auxiliary winding side is energized.

Means for Solving the Problem

In order to achieve the above object, there is provided in accordance with the present invention a drive system including an induction generator comprising some primary windings that has a main winding and an auxiliary winding, a traction inverter for supplying electric power to a traction motor, an auxiliary inverter for supplying electric power to an auxiliary motor, a rectifier having a terminal for alternating current connected to the main winding and a terminal for direct current connected to the traction inverter, and a converter for power generating having a terminal for alternating current connected to the auxiliary winding and a terminal for direct current connected to the auxiliary inverter. A maximum current value of the converter for power generating is set on the basis of a maximum output power of the auxiliary winding and a minimum voltage applied to the auxiliary winding at a time where the traction inverter is not in a regenerative mode of operation. A non-load current value of the induction generator is set such that a maximum current in the auxiliary winding at a time where the traction inverter is in the regenerative mode of operation does not exceed a maximum current in the converter for power generating.

According to the present invention configured as described above, in the drive system including the induction generator having the main winding and the auxiliary winding as the primary windings, by appropriately setting the maximum current value in the converter for power generating and the non-load current value of the induction generator, it is possible to supply, from the converter for power generating, electric power required by the auxiliary inverter, even when the traction inverter is in the regenerative mode of operation in which only the auxiliary winding is energized.

Advantages of the Invention

According to the present invention, in the drive system including the induction generator having the main winding and the auxiliary winding as the primary windings, it is possible to supply electric power required by the auxiliary inverter, even in the regenerative mode of operation in which only the auxiliary winding is energized.

MODES FOR CARRYING OUT THE INVENTION

Figure 1:
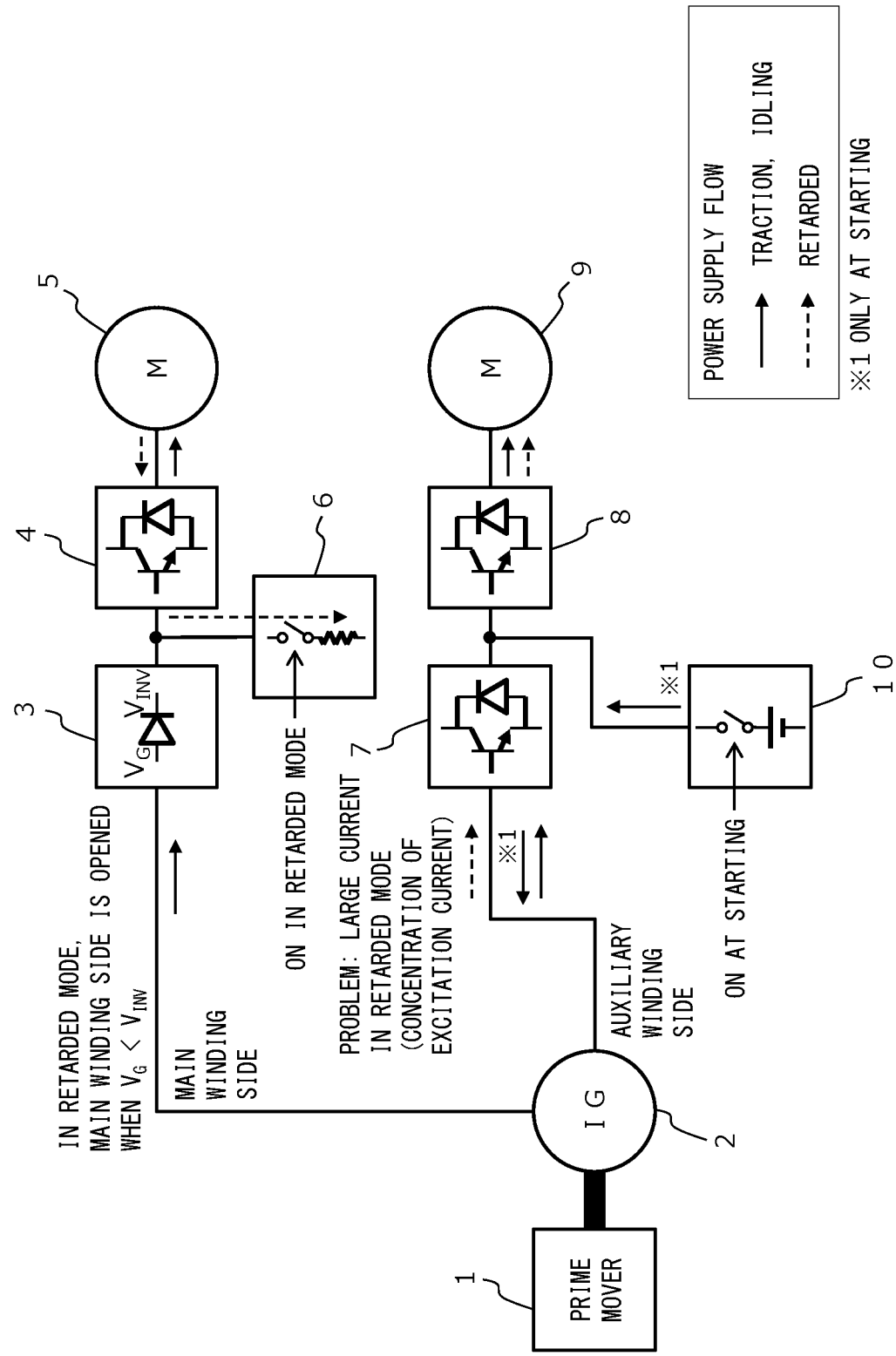
FIG. 1 is a diagram of a configuration of a drive system incorporated in an electrically driven dump truck.

Embodiments of the present invention will be described hereinbelow with reference to the drawings. Note that equivalent components are denoted by identical reference characters throughout views and their redundant description will be omitted.

First Embodiment

A drive system according to a first embodiment of the present invention will be described as a drive system incorporated in an electrically driven dump truck.

FIG. 1 is a diagram of a configuration of the drive system according to the present embodiment. As illustrated in FIG. 1, the drive system includes a dual-winding induction generator 2, a starter battery 10 for starting the dual-winding induction generator 2, a traction inverter 4 for driving a traction motor 5, an auxiliary inverter 8 for driving an auxiliary motor 9, a rectifier 3, a regenerative resistor 6, and a converter 7 for power generating. The dual-winding induction generator 2 is driven by a prime mover 1. The dual-winding induction generator 2 has a main winding and an auxiliary winding as the primary windings and a secondary conductor. The auxiliary motor 9 is, for example, a drive motor for driving a cooling fan for cooling the regenerative resistor 6 or the like.

The rectifier 3 has a terminal for alternating current connected to the main winding of the dual-winding induction generator 2 and a terminal for direct current connected to the traction inverter 4 and the regenerative resistor 6. When the traction motor 5 is in a regenerative mode of operation (retarded mode of operation), the regenerative resistor 6 is connected to the terminal for direct current of the rectifier 3 and a terminal for direct current of the traction inverter 4, and discharges electric power generated by the regenerative mode of operation of the traction motor 5. The converter 7 for power generating has a terminal for alternating current connected to the auxiliary winding of the dual-winding induction generator 2 and a terminal for direct current connected to the auxiliary inverter 8 and the starter battery 10. For starting the dual-winding induction generator 2, the starter battery 10 is connected to the converter 7 for power generating and supplies electric power to the converter 7 for power generating.

The electric power required by the traction inverter 4 is larger than the electric power required by the auxiliary inverter 8. Therefore, the converter that is more expensive than the rectifier becomes less costly by being connected to the auxiliary inverter 8 that requires smaller electric power, as illustrated in FIG. 1, than by being connected to the traction inverter 4.

The voltages applied to the main winding and the auxiliary winding of the dual-winding induction generator 2 are generally proportional to each other. Consequently, the voltage applied to the main winding of the dual-winding induction generator 2 can be controlled by varying the voltage applied to the auxiliary winding of the dual-winding induction generator 2 with the converter 7 for power generating. If the dual-winding induction generator 2 were replaced with a synchronous generator, then brushes would be needed to energize the excitation winding that controls the voltage. However, no brushes are required by the induction generator according to the present embodiment.

When the drive system is in an idling mode of operation, the dump truck is kept at rest, and the mechanical output power of the prime mover 1 is converted into AC power mainly by the auxiliary winding of the dual-winding induction generator 2. The magnitude and frequency of the voltage of the converted AC power are controlled by the converter 7 for power generating. When the drive system is in the idling mode of operation, the rectifier 3 is applied with a forward voltage, making the main winding side energizable.

When the drive system is in a traction mode of operation, the dump truck has its accelerator pedal depressed. The output power of the prime mover 1 is converted into AC power by the auxiliary winding of the dual-winding induction generator 2, as with the idling mode of operation, and is also converted into AC power mainly by the main winding of the dual-winding induction generator 2. The magnitude and frequency of the voltage of the converted AC power are controlled by the converter 7 for power generating. When the drive system is in the traction mode of operation, the rectifier 3 is applied with a forward voltage, making the main winding side of the dual-winding induction generator 2 energized.

In the retarded mode of operation, the dump truck has its brake pedal depressed. The mechanical output power of the prime mover 1 is converted into AC power by the auxiliary winding of the dual-winding induction generator 2, as with the idling mode of operation. The magnitude and frequency of the voltage of the converted AC power are controlled by the converter 7 for power generating. Further, the AC power regenerated by the traction motor 5 is converted into DC power by the traction inverter 4, and the magnitude of the voltage of the converted DC power is controlled by the traction inverter 4 such that the rectifier 3 is applied with a reverse voltage ($V_G < V_{INV}$). In the retarded mode of operation, therefore, the main winding side of the dual-winding induction generator 2 is not energized, but only the auxiliary winding side thereof is energized.

Since the dual-winding induction generator 2 is a kind of induction generator, it requires an excitation current for excitation. In the retarded mode of operation, as only the auxiliary winding side thereof can be energized, an excitation current is generated in its entirety in the auxiliary winding side, giving rise to the problem of an increase in the capacity required by the converter 7 for power generating.

On the other hand, if a dual-winding synchronous generator is used, since it is excited by a field winding provided separately from the auxiliary winding, the dual-winding synchronous generator is free of the problem of an increase in the capacity required by the converter 7 for power generating. However, the maintainability is lowered due to slip rings and brushes required.

Further, if a dual-winding permanent magnet generator is used, since it is excited by a permanent magnet, the dual-winding permanent magnet generator is free of the problem of an increase in the capacity required by the converter 7 for power generating. However, the cost is increased because the permanent magnet is required.

In addition, in a case where, even if the dual-winding induction generator is used, the dual-winding induction generator does not need to supply electric power to an auxiliary system as with Patent Document 1, if the voltage applied to the auxiliary winding side is lowered to reduce the excitation current in the retarded mode of operation, then, since the capacity required by the converter 7 for power generating is prevented from increasing, the problem of an increase in the capacity required by the converter 7 for power generating does not occur.

In a configuration where electric power is supplied to the auxiliary system as with the present embodiment, however, if the voltage applied to the auxiliary winding side is lowered to reduce the excitation current in the retarded mode of operation, then, since a current required to supply electric power to the auxiliary system, i.e., a load current, becomes larger conversely, resulting in the problem of an increase in the capacity required by the converter 7 for power generating.

In view of these considerations, the problem of an increase in the capacity required by the converter 7 for power generating in the retarded mode of operation is peculiar to the case where electric power needs to be supplied to the auxiliary system of the dual-winding induction generator.

If the converter 7 for power generating is placed on the main winding side and the rectifier is placed on the auxiliary winding side, then the induction generator is not operated to open the main winding side even in the retarded mode of operation because the induction winding would go out of control by opening the main winding side in the retarded mode of operation. Consequently, even in a case where electric power needs to be supplied to the auxiliary system of the dual-winding induction generator, the problem of an increase in the capacity required by the converter 7 for power generating does not occur in the retarded mode of operation.

As described above, in the idling mode of operation and the traction mode of operation in which the traction inverter 4 is not in the regenerative mode of operation, both the main winding side and the auxiliary winding can be energized. On the other hand, in the retarded mode of operation in which the traction motor 5 is in the regenerative mode of operation, only the auxiliary winding side is energized, and an excitation current is generated in its entirety in the auxiliary winding side, increasing the capacity required by the converter 7 for power generating. Stated otherwise, a dual-winding induction generator with specifications including a small excitation current restrains the capacity required by the converter 7 for power generating from increasing.

According to the present embodiment, the converter 7 for power generating is of such a capacity as to be able to supply electric power required by the auxiliary inverter 8 in the idling mode of operation and the traction mode of operation, and used as the dual-winding induction generator 2 is a dual-winding induction generator having specifications including a small excitation current such that the converter 7 for power generating can supply electric power required by the auxiliary inverter 8, even in the retarded mode of operation in which only the auxiliary winding side is energized.

Specifications of an excitation current of the dual-winding induction generator 2 will be formulated below.

Figure 2:
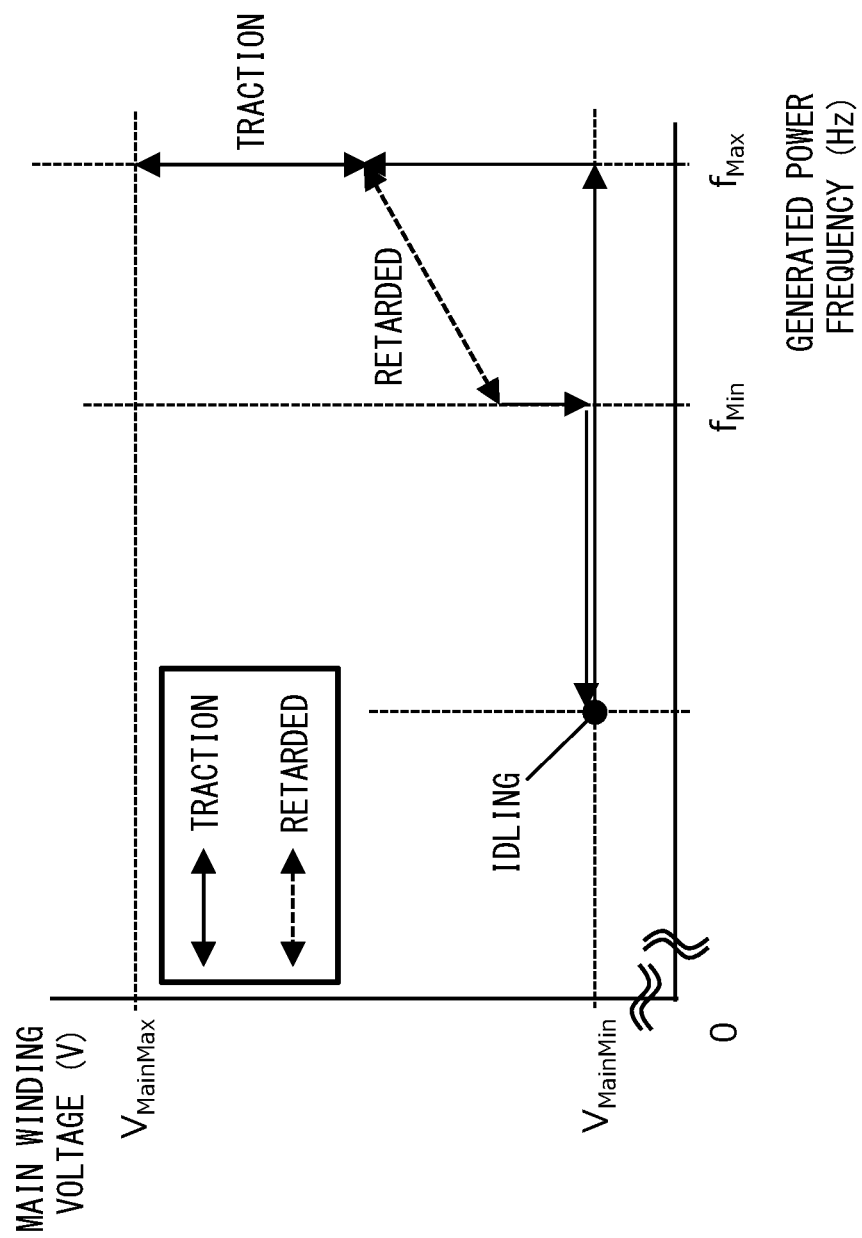
FIG. 2 is an explanatory diagram illustrating main winding voltages and generated power frequencies of a dual-winding induction generator in each of modes of operation of the electrically driven dump truck.

FIG. 2 is an explanatory diagram illustrating main winding voltages and generated power frequencies of the dual-winding induction generator 2 in each of modes of operation of the electrically driven dump truck. In FIG. 2, the vertical axis represents the main winding voltage, and the horizontal axis represents the generated power frequency.

In the idling mode of operation, since the mechanical output power of the prime mover 1 is small, the rotational speed thereof is reduced to increase the efficiency of the prime mover 1. Since the rotational speed is low, the generated power frequency is low. When the generated power frequency is low, the voltage that can be generated is low. The effective value of the voltage applied to the main winding side of the dual-winding induction generator 2 in the idling mode of operation is indicated by $V_{MainMin}$.

In the traction mode of operation, since the mechanical output power of the prime mover 1 is large, the rotational speed thereof for increasing the efficiency of the prime mover 1 is high. Since the rotational speed is high, the generated power frequency is high. When the generated power frequency is high, the voltage that can be generated is high. The effective value of the maximum voltage applied to the main winding side of the dual-winding induction generator 2 in the traction mode of operation is indicated by $V_{MainMax}$, and the generated power frequency of the dual-winding induction generator 2 in the traction mode of operation is indicated by $f_{Max}$.

In the retarded mode of operation, the mechanical output power of the prime mover 1 is small as in the idling mode of operation. However, the rotational speed of the prime mover 1 is higher than in the idling mode of operation in order to be able to switch quickly to the traction mode of operation. Since the rotational speed is higher than in the idling mode of operation, the generated power frequency is higher. Since the generated power frequency is higher than in the idling mode of operation, the voltage that can be generated is higher. The minimum value of the generated power frequency of the dual-winding induction generator 2 in the retarded mode of operation is indicated by $f_{Min}$, and the maximum value thereof is indicated by $f_{Max}$ as in the traction mode of operation.

As described above, in the idling mode of operation and the traction mode of operation in which the traction inverter 4 is not in the regenerative mode of operation, the main winding side is also energized. In the idling mode of operation, since the voltage is lower than in the traction mode of operation, the current required to supply electric power to the auxiliary inverter 8 is large, and the capacity required by the converter 7 for power generating is large. That is, the converter 7 for power generating that is of such a capacity as to be able to supply electric power required by the auxiliary inverter 8 in the idling mode of operation is also able to supply electric power required by the auxiliary inverter 8 in the traction mode of operation.

Moreover, in the retarded mode of operation, only the auxiliary winding side is energized. As the rotational speed of the prime mover 1 is higher than in the idling mode of operation, the voltage that the auxiliary winding side can generate is higher than in the idling mode of operation, and the current required to supply electric power to the auxiliary inverter 8, i.e., the load current, is smaller than in the idling mode of operation.

In a stage prior to formulating a capacity of the converter 7 for power generating that is required in the idling mode of operation in which the traction inverter 4 is not in the regenerative mode of operation and in the retarded mode of operation in which the traction inverter 4 is in the regenerative mode of operation, a general equation representing the converter capacity is indicated below. Providing the effective value of the maximum voltage applied to the auxiliary winding side of the dual-winding induction generator 2 is indicated by $V_{AuxMax}$ and the effective value of the maximum current in the auxiliary winding side of the dual-winding induction generator 2 is indicated by $I_{AuxMax}$, the capacity $S_{ConvAux}$ required by the converter 7 for power generating is expressed by the following equation.

[Formula 1]

$$S_{ConvAux} = \sqrt{3} V_{AuxMax} \times I_{AuxMax} \quad \text{(Equation 1)}$$

Providing the effective turn ratio (main/auxiliary) of the main winding to the auxiliary winding of the dual-winding induction generator 2 is indicated by TR, the effective value $V_{AuxMax}$ of the maximum voltage applied to the auxiliary winding side of the dual-winding induction generator 2 and the effective value $V_{AuxMin}$ of the minimum voltage applied to the auxiliary winding side of the dual-winding induction generator 2 are expressed by the following equations.

[Formula 2]

$$V_{AuxMax} = V_{MainMax}/TR \quad \text{(Equation 2)}$$

[Formula 3]

$$V_{AuxMin} = V_{MainMin}/TR \quad \text{(Equation 3)}$$

The capacity of the converter 7 for power generating that is required in the idling mode of operation in which the traction inverter 4 is not in the regenerative mode of operation will be formulated below. Providing the maximum output power of the auxiliary winding side of the dual-winding induction generator 2 is indicated by $P_{AuxMax}$ and the power factor of the auxiliary winding side of the dual-winding induction generator 2 is indicated by $PF_{Aux}$, the effective value $I_{AuxMaxIdl}$ of the maximum current in the auxiliary winding side of the dual-winding induction generator 2 in the idling mode of operation is expressed by the following equation.

[Formula 4]

$$I_{AuxMaxIdl} = P_{AuxMax}/(\sqrt{3} V_{AuxMin} \times PF_{Aux}) \quad \text{(Equation 4)}$$

Inasmuch as the power factor $PF_{Aux}$ of the auxiliary winding side of the dual-winding induction generator 2 is 1 or less, the effective value $I_{AuxMaxIdl}$ is expressed by the following equation.

[Formula 5]

$$I_{AuxMaxIdl} \geq P_{AuxMax}/(\sqrt{3} V_{AuxMin}) \quad \text{(Equation 5)}$$

The $V_{AuxMin}$ defined as the minimum value of the effective value of the voltage applied the auxiliary winding side of the dual-winding induction generator 2 represents a minimum value of the voltage applied the auxiliary winding side of the dual-winding induction generator 2 unless the traction inverter 4 is in the regenerative mode of operation. Therefore, the maximum current value of the converter 7 for power generating is established on the basis of the maximum output power $P_{AuxMax}$ of the auxiliary winding side of the dual-winding induction generator 2 and the minimum voltage $V_{AuxMin}$ applied to the auxiliary winding side of the dual-winding induction generator 2 unless the traction inverter 4 is in the regenerative mode of operation.

Substituting the equation 2 for $V_{AuxMax}$ in the equation 1 and the equation 5 for $I_{AuxMax}$ in the equation 1, the capacity $S_{ConvAuxIdl}$ required by the converter 7 for power generating in the idling mode of operation is expressed by the following equation.

[Formula 6]

$$S_{ConvAuxIdl} \geq \sqrt{3}(V_{MainMax}/TR) \times (P_{AuxMax}/(\sqrt{3} V_{AuxMin})) \geq (V_{MainMax}/TR) \times (P_{AuxMax}/V_{AuxMin}) \quad \text{(Equation 6)}$$

Substituting the equation 3 for $V_{AuxMin}$ in the equation 6, the capacity $S_{ConvAuxIdl}$ required by the converter 7 for power generating in the idling mode of operation is expressed by the following equation.

[Formula 7]

$$S_{ConvAuxIdl} \geq (V_{MainMax}/TR) \times (P_{AuxMax}/(V_{MainMin}/TR)) \geq V_{MainMax} \times P_{AuxMax}/V_{MainMin} \geq P_{AuxMax} \times V_{MainMax}/V_{MainMin} \quad \text{(Equation 7)}$$

The capacity of the converter 7 for power generating that is required in the retarded mode of operation in which the traction inverter 4 is in the regenerative mode of operation will be formulated below.

Figure 3:
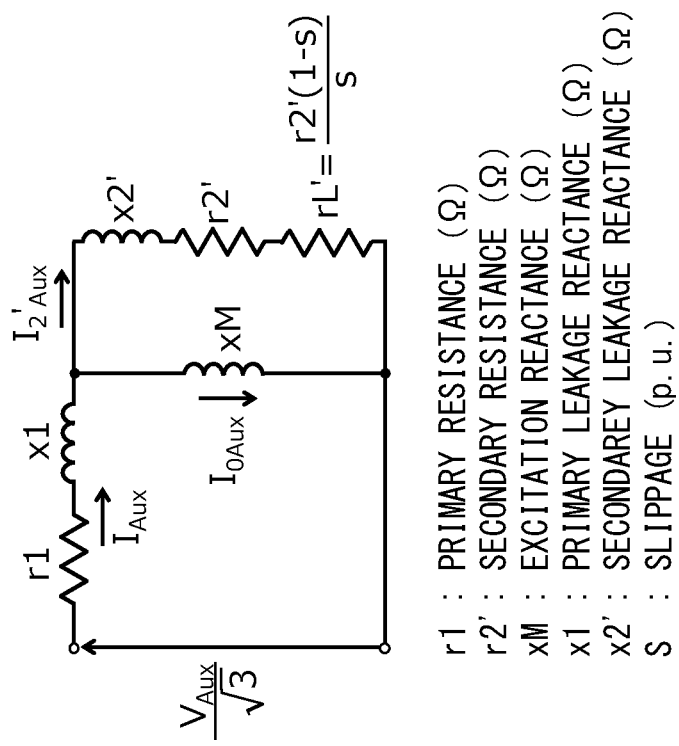
FIG. 3 is an explanatory diagram illustrating a T-type equivalent circuit of an auxiliary winding side of the dual-winding induction generator in a retarded mode of operation.

FIG. 3 is an explanatory diagram illustrating a T-type equivalent circuit of the auxiliary winding side of the dual-winding induction generator 2 in the retarded mode of operation. Since the main winding side is open in the retarded mode of operation, the dual-winding induction generator 2 is the same as general induction machines.

A primary resistance is indicated by r1, a secondary resistance by r2', an excitation reactance by xM, a primary leakage reactance by x1, a secondary leakage reactance by x2', a slip by s, and a load resistance by rL'. In addition, the effective value of the voltage applied to the auxiliary winding side of the dual-winding induction generator 2 is indicated by $V_{Aux}$, the effective value of the excitation current flowing in the auxiliary winding side of the dual-winding induction generator 2 by $I_{0Aux}$, the effective value of the load current in the auxiliary winding side of the dual-winding induction generator 2 by $I_{2'Aux}$, and the effective value of the current in the auxiliary winding side of the dual-winding induction generator 2 is indicated by $I_{Aux}$.

Figure 4:
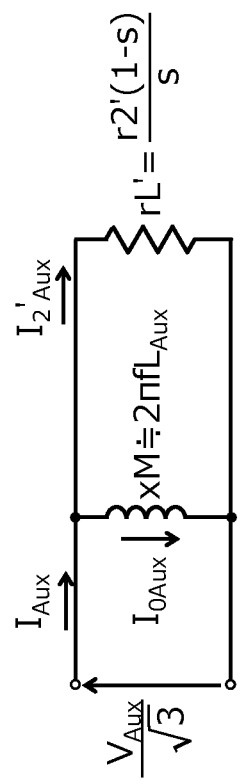
FIG. 4 is an explanatory diagram illustrating a simple equivalent circuit of the auxiliary winding side of the dual-winding induction generator in the retarded mode of operation.

FIG. 4 is an explanatory diagram illustrating a simple equivalent circuit of the auxiliary winding side of the dual-winding induction generator 2 in the retarded mode of operation. FIG. 4 represents a simplification of the T-type equivalent circuit illustrated in FIG. 3 that has been made to the extent that the capacity required by the converter 7 for power generating can generally be calculated. In FIG. 4, the generated power frequency of the dual-winding induction generator 2 is indicated by f, and the self-inductance value of the auxiliary winding side of the dual-winding induction generator 2 is indicated by $L_{Aux}$.

In FIG. 3, since the excitation reactance xM and the load resistance rL' are sufficiently larger than the primary resistance r1, the primary leakage reactance x1, the secondary leakage reactance x2', and the secondary resistance r2', only the excitation reactance xM and the load resistance rL' are simplified as illustrated in FIG. 4.

The self-reactance $X_{Aux}$ of the auxiliary winding of the dual-winding induction generator 2 is expressed by the following equation.

[Formula 8]

$$X_{Aux} = x1 + xM = 2\pi f L_{Aux} \quad \text{(Equation 8)}$$

Since the excitation reactance xM is sufficiently larger than the primary leakage reactance x1, the excitation reactance xM is expressed by the following equation.

[Formula 9]

$$xM \approx 2\pi f L_{Aux} \quad \text{(Equation 9)}$$

As the simple equivalent circuit illustrated in FIG. 4 is free of loss because the primary resistance r1 and the secondary resistance r2' are omitted, the output power $P_{Aux}$ of the auxiliary winding side of the dual-winding induction generator 2 is equal to the electric power inputted from the load resistance rL'. Therefore, output power $P_{Aux}$ of the auxiliary winding side of the dual-winding induction generator 2 is expressed by the following equation.

[Formula 10]

$$P_{Aux}=3 \times I_{2\,Aux}'^2 \times rL' \quad \text{(Equation 10)}$$

From the equation 10, the load resistance rL' is expressed by the following equation.

[Formula 11]

$$rL'=P_{Aux}/(3 \times I_{2\,Aux}'^2) \quad \text{(Equation 11)}$$

From the simple equivalent circuit illustrated in FIG. 4, the effective value $I_{2\,Aux}'$ of the load current in the auxiliary winding side of the dual-winding induction generator 2 is expressed by the following equation.

[Formula 12]

$$I_{2\,Aux}'=V_{Aux}/(\sqrt{3}\,rL') \quad \text{(Equation 12)}$$

Substituting the equation 11 for the load resistance rL' in the equation 12, the effective value $I_{2\,Aux}'$ of the load current in the auxiliary winding side of the dual-winding induction generator 2 is expressed by the following equation.

[Formula 13]

$$I_{2\,Aux}'=V_{Aux}/(\sqrt{3}\,P_{Aux}/(3 \times I_{2\,Aux}'^2))$$

$$I_{2\,Aux}'=(3/\sqrt{3}) \times (I_{2\,Aux}'^2 \times V_{Aux}/P_{Aux})$$

$$1=\sqrt{3} \times (I_{2\,Aux}' \times V_{Aux}/P_{Aux})$$

$$I_{2\,Aux}'=P_{Aux}/(\sqrt{3}\,V_{Aux}) \quad \text{(Equation 13)}$$

From the simple equivalent circuit illustrated in FIG. 4, the effective value $I_{0Aux}$ of the excitation current in the auxiliary winding side of the dual-winding induction generator 2 is expressed by the following equation.

[Formula 14]

$$I_{0Aux}=V_{Aux}/(\sqrt{3} \times 2\pi f L_{Aux}) \quad \text{(Equation 14)}$$

From the simple equivalent circuit illustrated in FIG. 4, the effective value $I_{0Aux}$ of the excitation current in the auxiliary winding side of the dual-winding induction generator 2 flows in a circuit that consists of only inductive reactance compositions, and the effective value $I_{2\,Aux}'$ of the load current in the auxiliary winding side of the dual-winding induction generator 2 flows in a circuit that consists of only resistance compositions, so that the phase difference between these currents is 90°. Consequently, the effective value $I_{Aux}$ of the current in the auxiliary winding side of the dual-winding induction generator 2, which is the norm of the currents, is expressed by the following equation.

[Formula 15]

$$I_{Aux}=\sqrt{I_{0Aux}^2+I_{2\,Aux}'^2} \quad \text{(Equation 15)}$$

From the equation 14, the effective value $I_{0Aux}$ of the excitation current in the auxiliary winding side of the dual-winding induction generator 2 is expressed by the following equation.

[Formula 16]

$$I_{0Aux}=V_{Aux}/a \quad \text{(Equation 16)}$$

[Formula 17]

$$a=\sqrt{3} \times 2\pi f L_{Aux} \quad \text{(Equation 17)}$$

From the equation 13, the effective value $I_{2\,Aux}'$ of the load current in the auxiliary winding side of the dual-winding induction generator 2 is expressed by the following equation.

[Formula 18]

$$I_{2\,Aux}'=b/V_{Aux} \quad \text{(Equation 18)}$$

[Formula 19]

$$b=P_{Aux}/\sqrt{3} \quad \text{(Equation 19)}$$

Substituting the equations 16 and 18 in the equation 15, the effective value $I_{Aux}$ of the current in the auxiliary winding side of the dual-winding induction generator 2 is expressed by the following equation.

[Formula 20]

$$I_{Aux}=\sqrt{(V_{Aux}/a)^2+(b/V_{Aux})^2}$$

$$I_{Aux}=\sqrt{I2} \quad \text{(Equation 20)}$$

[Formula 21]

$$I2=V2/a^2+b^2/V2 \quad \text{(Equation 21)}$$

[Formula 22]

$$I2=V_{Aux}^2 \quad \text{(Equation 22)}$$

According to the equation 20, when $V_{Aux}$ is infinite, $V_{Aux}/a$ is infinite, and also, when V is 0, $b/V_{Aux}$ is infinite, so that a minimum value of $I_{Aux}$ exists when $V_{Aux}$ ranges from 0 to infinity. In the retarded mode of operation, $V_{Aux}$ is controlled in order to reduce $I_{Aux}$. The equation 21 as it is differentiated with respect to V2 is expressed by the following equation.

[Formula 23]

$$\frac{dI2}{dV2}=1/a^2-b^2/V2^2 \quad \text{(Equation 23)}$$

When the equation 23 becomes 0, $I_{Aux}$ takes a minimum value, and V2 under the condition of $I_{Aux}$ taking a minimum value is expressed by the following equation.

[Formula 24]

$$0=1/a^2-b^2/V2^2$$

$$b^2/V2^2=1/a^2$$

$$V2^2=a^2 b^2$$

$$V2=ab \quad \text{(Equation 24)}$$

Substituting the equation 22 for V2, the equation 17 for a, and the equation 19 for b in the equation 24, $V_{Aux2}$ and $V_{Aux}$ under the condition of $I_{Aux}$ taking a minimum value are expressed by the following equations.

[Formula 25]

$$V_{Aux}^2=\sqrt{3} \times 2\pi f L_{Aux} P_{Aux}/\sqrt{3}=2\pi f L_{Aux} P_{Aux} \quad \text{(Equation 25)}$$

[Formula 26]

$$V_{Aux} = \sqrt{2\pi f L_{Aux} P_{Aux}} \quad \text{(Equation 26)}$$

Substituting the equation 24 in the equation 21, I2 under the condition of $I_{Aux}$ taking a minimum value is expressed by the following equation.

[Formula 27]

$$I = ab/a^2 + b^2/ab = b/a + b/a = 2b/a \quad \text{(Equation 27)}$$

Substituting the equation 17 for a and the equation 19 for b in the equation 27, I2 under the condition of $I_{Aux}$ taking a minimum value is expressed by the following equation.

[Formula 28]

$$I2 = 2(p_{Aux}/\sqrt{3})/(\sqrt{3} \times 2\pi f L_{Aux}) = p_{Aux}/(3\pi f L_{Aux}) \quad \text{(Equation 28)}$$

Substituting the equation 28 for I2 in the equation 20, the minimum value of $I_{Aux}$ is expressed by the following equation.

[Formula 29]

$$I_{Aux} = \sqrt{\frac{P_{Aux}}{3\pi f L_{Aux}}} \quad \text{(Equation 29)}$$

In the retarded mode of operation, when the output power $P_{Aux}$ of the auxiliary winding side of the dual-winding induction generator 2 is maximum and the generated power frequency f of the dual-winding induction generator 2 is minimum, the minimum value of $I_{Aux}$ becomes maximum according to the equation 29. Providing the self-inductance value of the auxiliary winding side of the dual-winding induction generator 2 at this time (hereinafter referred to as "when the minimum value of $I_{Aux}$ becomes maximum in the retarded mode of operation") is indicated by $L_{AuxMaxRet}$ and the maximum output power required of the auxiliary winding side of the dual-winding induction generator 2 is indicated by $P_{AuxMax}$, the effective value $I_{AuxMaxRet}$ of the maximum current in the auxiliary winding side of the dual-winding induction generator 2 in the retarded mode of operation is expressed by the following equation.

[Formula 30]

$$I_{AuxMaxRet} = \sqrt{\frac{P_{AuxMax}}{3\pi f_{Min} L_{AuxMaxRet}}} \quad \text{(Equation 30)}$$

Similarly, the effective value $V_{AuxMaxRet}$ of the voltage applied to the auxiliary winding side of the dual-winding induction generator 2 under the condition of the minimum value of $I_{Aux}$ becoming maximum in the retarded mode of operation is expressed by the following equation.

[Formula 31]

$$V_{AuxMaxRet} = \sqrt{2\pi f_{Min} L_{AuxMaxRet} P_{AuxMax}} \quad \text{(Equation 31)}$$

Substituting the equation 2 for $V_{AuxMax}$ and the equation 30 for $I_{AuxMax}$ in the equation 1, the capacity $S_{ConvAuxRet}$ required by the converter 7 for power generating in the retarded mode of operation is expressed by the following equation.

[Formula 32]

$$S_{ConvAuxRet} = \sqrt{3} \, (V_{MainMax}/TR) \times \sqrt{\frac{P_{AuxMax}}{3\pi f_{Min} L_{AuxMaxRet}}} \quad \text{(Equation 32)}$$

$$= (V_{MainMax}/TR) \times \sqrt{\frac{P_{AuxMax}}{\pi f_{Min} L_{AuxMaxRet}}}$$

$$= V_{MainMax} \times \sqrt{\frac{P_{AuxMax}}{\pi f_{Min} L_{AuxMaxRet} TR^2}}$$

The self-inductance value $L_{MainMaxRet}$ of the main winding side of the dual-winding induction generator 2 under the condition of the minimum value of $I_{Aux}$ becoming maximum in the retarded mode of operation is expressed by the following equation.

[Formula 33]

$$L_{MainMaxRet} = L_{AuxMaxRet} \times TR^2 \quad \text{(Equation 33)}$$

From the equation 33, the self-inductance value $L_{AuxMaxRet}$ of the auxiliary winding side of the dual-winding induction generator 2 under the condition of the minimum value of $I_{Aux}$ becoming maximum in the retarded mode of operation is expressed by the following equation.

[Formula 34]

$$L_{AuxMaxRet} = L_{MainMaxRet}/TR^2 \quad \text{(Equation 34)}$$

Substituting the equation 34 for $L_{AuxMaxRet}$ in the equation 32, the capacity $S_{ConvAuxRet}$ required by the converter 7 for power generating in the retarded mode of operation is expressed by the following equation.

[Formula 35]

$$S_{ConvAuxRet} = V_{MainMax} \times \sqrt{\frac{P_{AuxMax}}{\pi f_{Min} L_{MainMaxRet}}} \quad \text{(Equation 35)}$$

The self-inductance value $L_{MainMaxRet}$ of the main winding side of the dual-winding induction generator 2 that makes the capacity $S_{ConvAuxRet}$, expressed by the equation 35, required by the converter 7 for power generating in the retarded mode of operation equal to or less than the capacity $S_{ConvAuxIdl}$, expressed by the equation 7, required by the converter 7 for power generating in the idling mode of operation will be formulated below.

The relation representing $S_{ConvAuxRet}$ equal to or less than $S_{ConvAuxIdl}$ is expressed by the following equation.

[Formula 36]

$$S_{ConvAuxIdl} \geq S_{ConvAuxRet} \quad \text{(Equation 36)}$$

Substituting the equation 7 for $S_{ConvAuxIdl}$ and the equation 35 for $S_{ConvAuxRet}$ in the equation 36, the self-inductance value $L_{MainMaxRet}$ of the main winding side of the dual-winding induction generator 2 that makes the capacity $S_{ConvAuxRet}$ required by the converter 7 for power generating in the retarded mode of operation equal to or less than the capacity $S_{ConvAuxIdl}$ required by the converter 7 for power generating in the idling mode of operation is expressed by the following equation.

[Formula 37]

$$P_{AuxMax} \times V_{MainMax}/V_{MainMin} \geq$$
$$V_{MainMax} \times \sqrt{\frac{P_{AuxMax}}{\pi f_{Min} L_{MainMaxRet}}}$$
$$P_{AuxMax}/V_{MainMin} \geq \sqrt{\frac{P_{AuxMax}}{\pi f_{Min} L_{MainMaxRet}}}$$
$$P_{AuxMax}^2/V_{MainMin}^2 \geq \frac{P_{AuxMax}}{\pi f_{Min} L_{MainMaxRet}}$$
$$P_{AuxMax}/V_{MainMin}^2 \geq \frac{1}{\pi f_{Min} L_{MainMaxRet}}$$
$$L_{MainMaxRet} \geq V_{MainMin}^2/(\pi f_{Min} P_{AuxMax})$$

(Equation 37)

Therefore, by using the dual-winding induction generator having such specifications as the self-inductance value $L_{MainMaxRet}$ of the main winding side that is indicated by the equation 37, it is possible to supply the electric power required by the auxiliary inverter 8, even in the retarded mode of operation in which only the auxiliary winding side is energized.

Specifications of the excitation current of the dual-winding induction generator 2 that makes the capacity $S_{ConvAuxRet}$, which is expressed by the equation 35, required by the converter 7 for power generating in the retarded mode of operation equal to or less than the capacity $S_{ConvAuxIdl}$, expressed by the equation 7, required by the converter 7 for power generating in the idling mode of operation will be formulated below.

Substituting $V_{AuxMaxRet}$ for $V_{Aux}$, $f_{Min}$ for $f$, and $L_{AuxMaxRet}$ for $L_{Aux}$ in the equation 14, the effective value $I_{0AuxMaxRet}$ of the excitation current in the auxiliary winding side of the dual-winding induction generator 2 under the condition of the minimum value of $I_{Aux}$ becoming maximum in the retarded mode of operation is expressed by the following equation.

[Formula 38]

$$I_{0AuxMaxRet} = V_{AuxMaxRet}/(\sqrt{3} \times 2\pi f_{Min} L_{AuxMaxRet})$$

(Equation 38)

The excitation current according to the equation 38 represents a characteristic of the situation which the minimum value of becomes maximum in the retard mode of operation.

The excitation current in the main winding side of the dual-winding induction generator 2 can be obtained from a non-load current in the main winding side under the condition of the auxiliary winding side of the dual-winding induction generator 2 being opened. Since the auxiliary winding side is open, a non-load current in the main winding side can be calculated, experimented, and measured as with a general induction machine having only a main winding side, and the excitation current in the main winding side of the dual-winding induction generator 2 can be obtained without using special methods peculiar to the dual-winding configuration. In general, since a non-load test is conducted at a rated frequency, the excitation current is formulated at the generated power frequency f as the rated frequency, i.e., at the generated power frequency $f_{Max}$ in the traction mode of operation. The voltage is set to $V_{MainMax}$ that becomes maximum in the traction mode of operation.

Defining the $L_{MainMax}$ as the self-inductance value of the main winding side of the dual-winding induction generator 2 under the condition of the generated power frequency being equal to $f_{Max}$ and the voltage applied to the main winding side being equal to $V_{MainMax}$, the effective value $I_{0MainMax}$ of the excitation current in the main winding side under the condition is expressed by the following equation.

[Formula 39]

$$I_{0MainMax} = V_{MainMax}/(\sqrt{3} \times 2\pi f_{Max} L_{MainMax})$$

(Equation 39)

If the dual-winding induction generator 2 is under the condition of the generated power frequency being equal to $f_{Max}$ and the voltage applied to the main winding side being equal to $V_{MainMax}$, defining $S_{Main}$ as the power generating capacity of the main winding side, the effective value $I_{MainMax}$ of the rated current in the main winding side of is expressed by the following equation.

[Formula 40]

$$I_{MainMax} = S_{Main}/(\sqrt{3} V_{MainMax})$$

(Equation 40)

The excitation current with respect to the rated current in the main winding side of the dual-winding induction generator 2 under the condition of the generated power frequency being equal to $f_{Max}$ and the voltage applied to the main winding side being equal to $V_{MainMax}$ is obtained by dividing the equation 39 by the equation 40, and is expressed by the following equation.

[Formula 41]

$$\frac{I_{0MainMax}}{I_{MainMax}} = (V_{MainMax}/(\sqrt{3} \times 2\pi f_{Max} L_{MainMax}))/$$
$$(S_{Main}/\sqrt{3} V_{MainMax}))$$
$$= V_{MainMax}^2/(2\pi f_{Max} L_{MainMax})/S_{Main}$$

(Equation 41)

It is not same grade of magnetic saturation at the moment when the generated power frequency is $f_{Max}$ and the voltage applied to the main winding side is $V_{MainMax}$ and at the moment when the minimum value of $I_{Aux}$ becomes maximum in the retarded mode of operation. A saturation coefficient Ks which expresses the difference between the grades of magnetic saturation at these states of operation is expressed by the following equation.

[Formula 42]

$$K_s = L_{MainMaxRet}/L_{MainMax}$$

(Equation 42)

From the equation 42, $L_{MainMax}$ is expressed by the following equation.

[Formula 43]

$$L_{MainMax} = L_{MainMaxRet}/K_s$$

(Equation 43)

Substituting the equation 43 for $L_{MainMax}$ in the equation 41, the excitation current with respect to the rated current in the main winding side of the dual-winding induction generator 2 under the condition of the generated power frequency being equal to $f_{Max}$ and the voltage applied to the main winding side being equal to $V_{MainMax}$ is expressed by the following equation.

[Formula 44]

$$\frac{I_{0MainMax}}{I_{MainMax}} = V_{MainMax}^2/(2\pi f_{Max}(L_{MainMaxRet}/K_s))/S_{Main}$$ (Equation 44)

$$= K_s V_{MainMax}^2/(2\pi f_{Max} L_{MainMaxRet})/S_{Main}$$

Substituting the equation 37 for $L_{MainMaxRet}$ in the equation 44, the excitation current with respect to the rated current in the main winding side of the dual-winding induction generator 2 under the condition of the generated power frequency being equal to $f_{Max}$ and the voltage applied to the main winding side being equal to $V_{MainMax}$, when the dual-winding induction generator 2 is used to make the capacity $S_{ConvAuxRet}$ required by the converter 7 for power generating in the retarded mode of operation equal to or less than the capacity $S_{ConvAuxIdl}$ required by the converter 7 for power generating in the idling mode of operation, is expressed by the following equation.

[Formula 45]

$$\frac{I_{0MainMax}}{I_{MainMax}} \le K_s V_{MainMax}^2/(2\pi f_{Max} V_{MainMin}^2/(\pi f_{Min} P_{AuxMax}))/S_{Main}$$ (Equation 45)

$$\le 0.5\ K_s(P_{AuxMax}/S_{Main})(f_{Min}/f_{Max})(V_{MainMax}/V_{MainMin})^2$$

As described above, according to the present embodiment, there is used, as the dual-winding induction generator 2, a dual-winding induction generator with specifications including a small excitation current such that the converter 7 for power generating can supply electric power required by the auxiliary inverter 8, even in the retarded mode of operation in which only the auxiliary winding side is energized. By using the dual-winding induction generator 2 having specifications that include the excitation current expressed by the equation 45, the converter 7 for power generating can supply electric power required by the auxiliary inverter 8, even in the retarded mode of operation in which only the auxiliary winding side is energized.

The capacity $S_{ConvAuxIdl}$ required by the converter 7 for power generating in the idling mode of operation is determined from the product of the effective value $V_{AuxMax}$ of the maximum voltage applied to the auxiliary winding side of the dual-winding induction generator 2 and the effective value $I_{AuxMaxIdl}$ of the maximum current in the auxiliary winding side of the dual-winding induction generator 2 in the idling mode of operation.

The capacity $S_{ConvAuxRet}$ required by the converter 7 for power generating in the retarded mode of operation is determined from the product of the effective value $V_{AuxMax}$ of the maximum voltage applied to the auxiliary winding side of the dual-winding induction generator 2 and the effective value $I_{AuxMaxRet}$ of the maximum current in the auxiliary winding side of the dual-winding induction generator 2 in the retarded mode of operation.

As described above, either one of the maximum voltages for determining $S_{ConvAuxIdl}$ and $S_{ConvAuxRet}$ is represented by $V_{AuxMax}$. That is, it can also be said that the self-inductance value $L_{MainMaxRet}$ of the main winding side of the dual-winding induction generator 2 and the excitation current with respect to the rated current in the main winding side of the dual-winding induction generator 2 under the condition of the generated power frequency being equal to $f_{Max}$ and the voltage applied to the main winding side being equal to $V_{MainMax}$ are determined by the equation 37 and the equation 45 in order for the maximum current $I_{AuxMaxRet}$ in the auxiliary winding side under the condition of the traction inverter 4 being in the regenerative mode of operation not to exceed the maximum current $I_{AuxMaxIdl}$ in the converter 7 for power generating.

Figure 5:
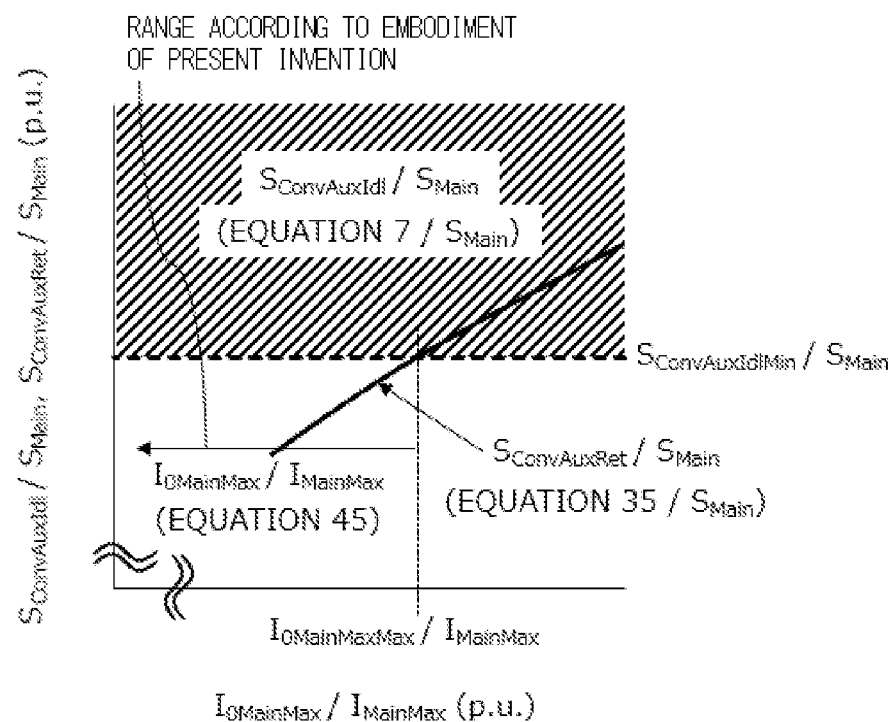
FIG. 5 is an explanatory diagram illustrating the relation between an excitation current and the capacity required by a converter for power generating.

FIG. 5 is an explanatory diagram illustrating the relation between the excitation current and the capacity required by the converter 7 for power generating. In FIG. 5, the horizontal axis represents the excitation current $I_{0MainMax}$ with respect to the rated current $I_{MainMax}$, and the vertical axis represents the capacity $S_{ConvAux}$ required by the converter 7 for power generating with respect to the power generating capacity $S_{Main}$ of the main winding side of the dual-winding induction generator 2.

Dividing a minimum value $S_{ConvAuxIdlMin}$ of the capacity $S_{ConvAuxIdl}$, which is expressed by the equation 7, required by the converter 7 for power generating in the idling mode of operation by the power generating capacity $S_{Main}$ of the main winding of the dual-winding induction generator 2 is expressed by the following equation.

[Formula 46]

$$\frac{S_{ConvAuxIdlMin}}{S_{Main}} = (P_{AuxMax}/S_{Main}) \times (V_{MainMax}/V_{MainMax})$$ (Equation 46)

The capacity required by the converter 7 for power generating is restrained from increasing, when a dual-winding induction generator having specifications including a small excitation current is used to make the capacity $S_{ConvAuxRet}$ required by the converter 7 for power generating in the retarded mode of operation with respect to the power generating capacity $S_{Main}$ of the main winding of the dual-winding induction generator 2 equal to or less than $S_{ConvAuxIdlMin}/S_{Main}$ according to the equation 46.

From the equation 45, when the dual-winding induction generator 2 that can make the capacity $S_{ConvAuxRet}$ required by the converter 7 for power generating in the retarded mode of operation equal to or less than the capacity $S_{ConvAuxIdl}$ required by the converter 7 for power generating in the idling mode of operation is used, the maximum value $I_{0MainMaxMax}/V_{MainMax}$ of the excitation current with respect to the rated current in the main winding side of the dual-winding induction generator 2 under the condition of the generated power frequency being equal to $f_{Max}$ and the voltage applied to the main winding side being equal to $V_{MainMax}$ is expressed by the following equation.

[Formula 47]

$$\frac{I_{0MainMaxMax}}{I_{MainMax}} =$$ (Equation 47)

$$0.5\ K_s(P_{AuxMax}/S_{Main})(f_{Min}/f_{Max})(V_{MainMax}/V_{MainMin})^2$$

As illustrated in FIG. 5, by using the dual-winding induction generator 2 in which the excitation current with respect to the rated current in the main winding side of the dual-winding induction generator 2 under the condition of the generated power frequency being equal to $f_{Max}$ and the voltage applied to the main winding side being equal to $V_{MainMax}$ is equal to or less than $I_{0MainMaxMax}/V_{MainMax}$ the capacity $S_{ConvAuxRet}$ required by the converter 7 for power generating in the retarded mode of operation with respect to the power generating capacity $S_{Main}$ of the main winding side of the dual-winding induction generator 2 becomes equal to or less than $S_{ConvAuxIdlMin}/S_{Main}$ according to the equation 46.

CONCLUSIONS

According to the present embodiment, in the drive system including the induction generator 2 comprising the primary windings that has the main winding and the auxiliary winding, the traction inverter 4 for supplying electric power to the traction motor 5, the auxiliary inverter 8 for supplying electric power to the auxiliary motor 9, the rectifier 3 having the terminal for alternating current connected to the main winding and the terminal for direct current connected to the traction inverter 4, and the converter 7 for power generating having the terminal for alternating current connected to the auxiliary winding and the terminal for direct current connected to the auxiliary inverter 8, the maximum current value $I_{AuxMaxIdl}$ in the converter 7 for power generating is set on the basis of the maximum output power $P_{AuxMax}$ of the auxiliary winding and the minimum voltage $V_{AuxMin}$ applied to the auxiliary winding unless the traction inverter is in the regenerative mode of operation, and the non-load current value of the induction generator 2 is set such that the maximum current $I_{AuxMaxRet}$ in the auxiliary winding under the situation of the traction inverter 4 being in the regenerative mode of operation does not exceed the maximum current value in the converter 7 for power generating.

According to the present embodiment configured as described above, in the drive system including the induction generator 2 comprising the primary windings that has the main winding and the auxiliary winding, by appropriately setting the maximum current value in the converter 7 for power generating and the non-load current value of the induction generator 2, it is possible to supply, from the converter 7 for power generating, electric power required by the auxiliary inverter 8, even when the traction inverter 4 is in the regenerative mode of operation in which only the auxiliary winding side is energized.

According to the present embodiment, further, providing the maximum voltage applied to the main winding of the induction generator 2 is indicated by $V_{MainMax}$, the minimum voltage applied to the main winding is indicated by $V_{MainMin}$, the maximum frequency of the induction generator 2 under the situation of the traction inverter 4 being in the regenerative mode of operation is indicated by $f_{Max}$, the minimum frequency of the induction generator 2 under the situation of the traction inverter 4 being in the regenerative mode of operation is indicated by $f_{Min}$, the power generating capacity of the main winding is indicated by $S_{Main}$, the maximum output power of the auxiliary winding is indicated by $P_{AuxMax}$, and the saturation coefficient as the ratio of the self-inductance value of the main winding under the condition of the minimum value of the current $I_{Aux}$ in the auxiliary winding becoming maximum under the situation of the traction inverter 4 being in the regenerative mode of operation with respect to the self-inductance value of the main winding under the condition of the generated power frequency of the induction generator 2 being equal to $f_{Max}$ and the voltage applied to the main winding side thereof being equal to $V_{MainMax}$ isindicated by $K_s$, the excitation current with respect to the rated current in the main winding is equal to or less than

[Formula 48]

$$0.5\ K_s \frac{P_{AuxMax}}{S_{Main}} \frac{f_{Min}}{f_{Max}} \left(\frac{V_{MainMax}}{V_{MainMin}}\right)^2$$

Inasmuch as an upper limit is set with respect to the excitation current of the induction generator 2, it is possible to restrain the capacity required by the converter 7 for power generating from increasing.

Second Embodiment

A second embodiment of the present invention will be described basically with respect to the differences from the first embodiment.

It is not same grades of magnetic saturation at the moment when the generated power frequency is $f_{Max}$ and the voltage applied to the main winding side is $V_{MainMax}$ and at the moment when the minimum value of $I_{Aux}$ becomes maximum in the retarded mode of operation. According to the equation 42, the difference between the grades of magnetic saturation at these states of operation is expressed by the saturation coefficient $K_s$ that is calculated from the ratio of the self-inductance value of the main winding side.

When considered on the basis of the equivalent circuits in FIG. 3 and FIG. 4, the self-inductance value L of an induction machine is calculated from the ratio of a voltage V to a current I while the induction machine is operating under no load with a slip s of 0, and is expressed by the following equation.

[Formula 49]

$$L = V/(\sqrt{3} \times 2\pi f \times I) \quad \text{(Equation 48)}$$

For calculating, according to the equation 48, $L_{AuxMaxRet}$ under the condition of the minimum value of IAux becoming maximum in the retarded mode of operation, it is necessary to calculate, according to the equation 31, the voltage $V_{AuxMaxRet}$ under the condition of the minimum value of $I_{Aux}$ becoming maximum in the retarded mode of operation. That is, in order to obtain the value of the saturation coefficient $K_s$, a task arises in that it is necessary to calculate the voltage $V_{AuxMaxRet}$ under the condition of the minimum value of $I_{Aux}$ becoming maximum in the retarded mode of operation.

Figure 6:
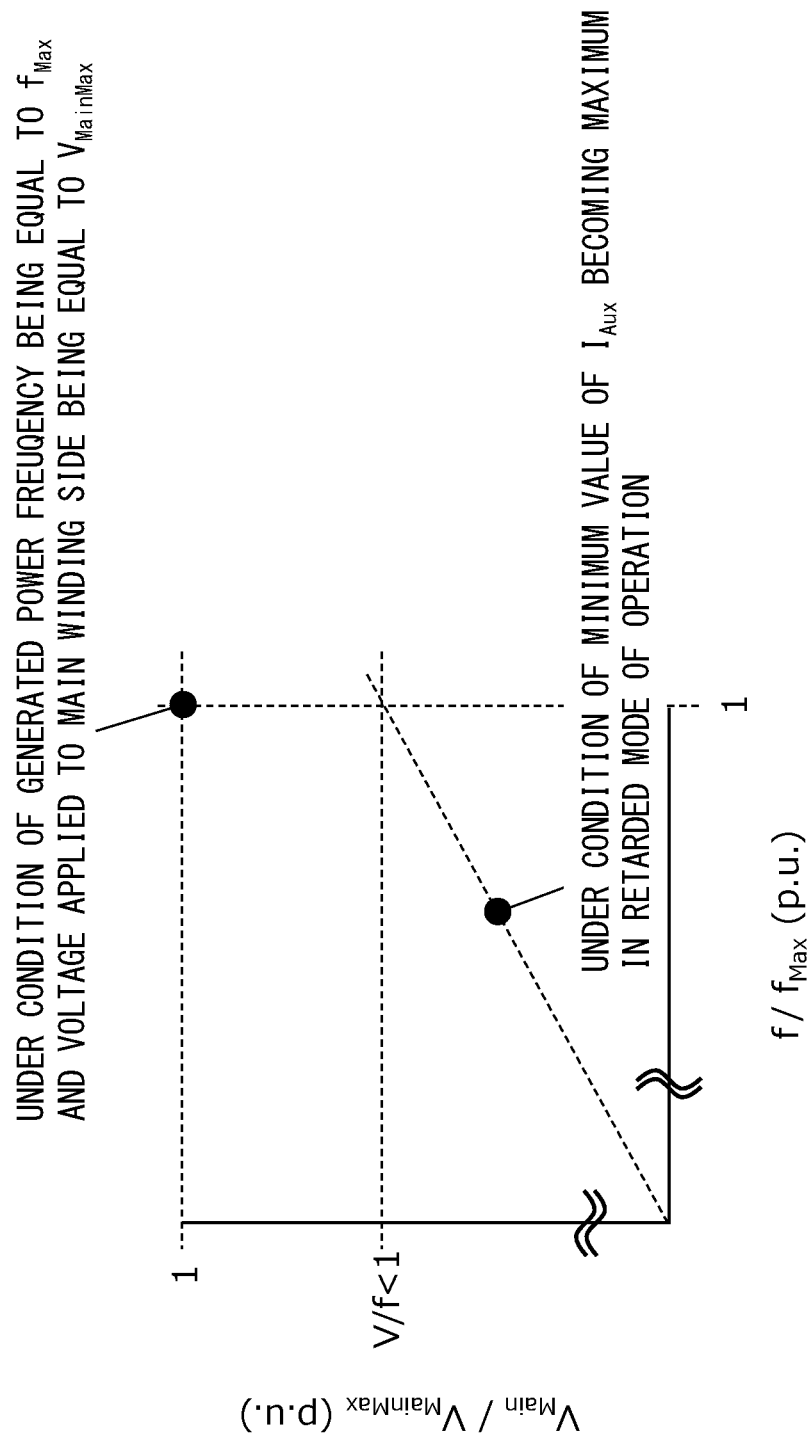
FIG. 6 is an explanatory diagram illustrating the voltage and frequency of the dual-winding induction generator under the condition of the minimum value of the effective value of a current in the auxiliary winding side becoming maximum in the retarded mode of operation.

FIG. 6 is an explanatory diagram illustrating the voltage and frequency of the dual-winding induction generator 2 under the condition of the minimum value of the effective value $I_{Aux}$ of the current in the auxiliary winding side becoming maximum in the retarded mode of operation. In FIG. 6, the horizontal axis represents the generated power frequency f with respect to $f_{Max}$, and the vertical axis represents the effective value $V_{Main}$ of the voltage applied to the main winding side of the dual-winding induction generator 2 with respect to $V_{MainMax}$.

The intensity of the magnetic flux density that determines the grades of magnetic saturation is proportional to voltage/frequency. The voltage/frequency under the condition of the generated power frequency being equal to $f_{Max}$ and the voltage applied to the main winding side being equal to $V_{MainMax}$ is equal to 1, whereas, when the voltage/frequency under the condition of the minimum value of $I_{Aux}$ becoming maximum in the retarded mode of operation is V/f control, the magnetic flux density of the latter is V/f times the former and is lower, as illustrated in FIG. 6.

Figure 7:
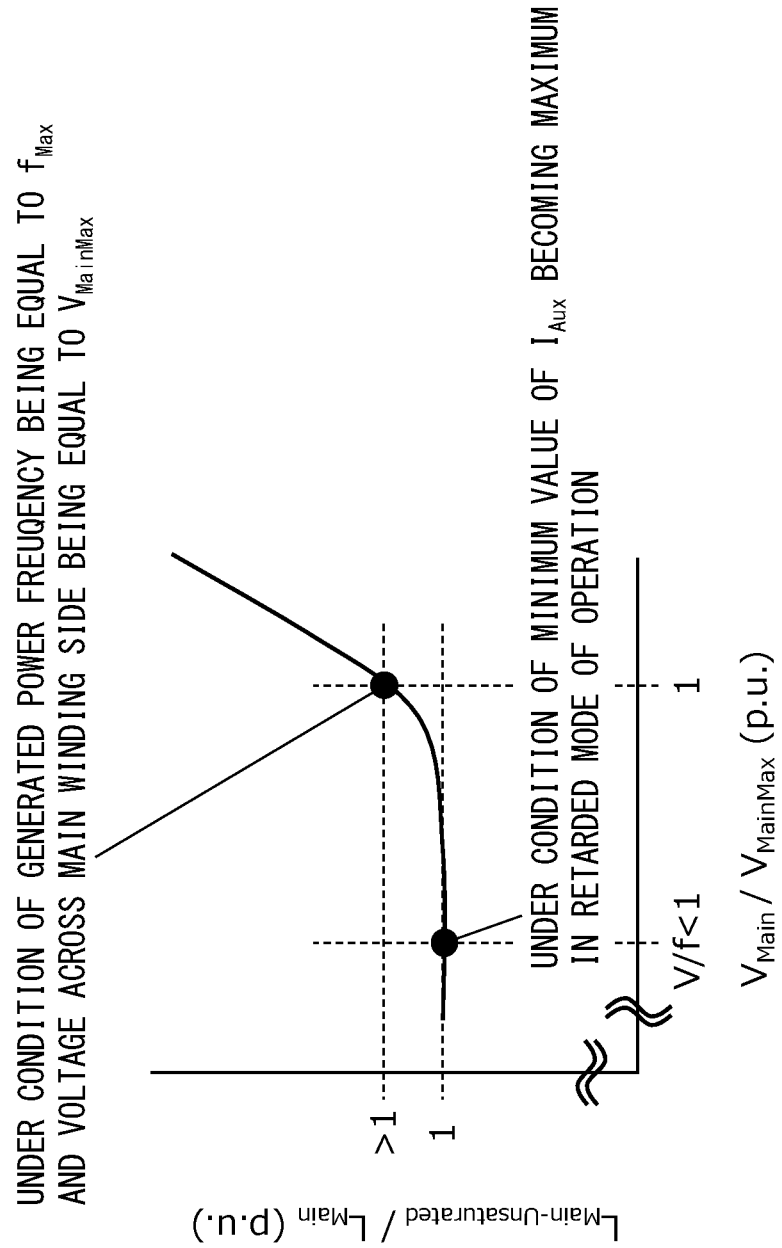
FIG. 7 is an explanatory diagram illustrating the relation between the self-inductance value and voltage of a main winding side of the dual-winding induction generator.

FIG. 7 is an explanatory diagram illustrating the relation between the self-inductance value and voltage of the main winding side of the dual-winding induction generator 2. In FIG. 7, the horizontal axis represents the effective value $V_{Main}$ of the voltage applied to the main winding side with respect to the effective value $V_{MainMax}$ of the maximum voltage applied to the main winding side, and the vertical axis represents the ratio of an unsaturated self-inductance value $L_{Main-Unsaturated}$ with respect to the self-inductance value $L_{Main}$ of the main winding side. The generated power frequency is $f_{Max}$.

In an experiment on L according to the equation 48, the minimum value of L under the situation of V being reduced in an experimentally feasible range represents the unsaturated self-inductance value $L_{Main-Unsaturated}$.

As illustrated in FIG. 7, the self-inductance value $L_{Main}$ under the condition of the minimum value of $I_{Aux}$ becoming maximum in the retarded mode of operation is approximately equal to the unsaturated self-inductance value $L_{Main-Unsaturated}$. Therefore, even if the voltage $V_{AuxMaxRet}$ under the condition of the minimum value of $I_{Aux}$ becoming maximum in the retarded mode of operation is unknown, the unsaturated self-inductance value $L_{Main-Unsaturated}$ is identified by way of experimentation, and the saturation coefficient $K_s$ according to the equation 42 is expressed by the following equation.

[Formula 50]

$$K_s = L_{Main-Unsaturated}/L_{MainMax} \quad \text{(Equation 49)}$$

Accordingly, the saturation coefficient $K_s$, which is expressed by the equation 49, under the condition of the generated power frequency being equal to $f_{Max}$ and the voltage applied to the main winding side being equal to $V_{MainMax}$ is obtained by calculating L according to the equation 48 from the relation between voltages and currents obtained by a general experiment called a non-load test on induction machines.

CONCLUSIONS

The saturation coefficient $K_s$ according to the present embodiment is set on the basis of the relation between voltages and currents obtained by a non-load test on the induction generator 2.

According to the present embodiment configured as described above, the excitation current in the main winding side of the dual-winding induction generator 2 can be obtained without using special methods peculiar to the dual-winding configuration, by setting the saturation coefficient $K_s$ on the basis of the relation between voltages and currents obtained by a non-load test on the induction generator 2.

Third Embodiment

A third embodiment of the present invention will be described basically with respect to the differences from the first embodiment.

Substituting the equation 37 for $L_{MainMaxRet}$ in the equation 43, the self-inductance value $L_{MainMax}$ of the main winding side of the dual-winding induction generator 2 under the condition of the generated power frequency being equal to $f_{Max}$ and the voltage applied to the main winding side being equal to $V_{MainMax}$ is expressed by the following equation.

[Formula 51]

$$L_{MainMax} \geq V_{MainMin}^2/(\pi K_s f_{Min} P_{AuxMax}) \quad \text{(Equation 50)}$$

Since the saturation coefficient $K_s$ obtained by the equation 42 or the equation 49 does not become smaller than 1, the range of the self-inductance value $L_{MainMax}$ of the main winding side of the dual-winding induction generator 2 under the condition of the generated power frequency being equal to $f_{Max}$ and the voltage applied to the main winding side being equal to $V_{MainMax}$ is expressed by the following equation.

[Formula 52]

$$\frac{V_{MainMin}^2}{\pi f_{Min} P_{AuxMax}} \geq L_{MainMax} \geq \frac{V_{MainMin}^2}{\pi K_s f_{Min} P_{AuxMax}} \quad \text{(Equation 51)}$$

If the dual-winding induction generator 2 is under the condition of generated power frequency being equal to $f_{Max}$ and the voltage applied to the main winding side being equal to $f_{Max}$, as the number of turns of the main winding of the dual-winding induction generator increases, the self-inductance value $L_{MainMax}$ that is the main winding side of the dual-winding increases. However, to increase the number of turns make the copper loss of the dual-winding induction generator 2 increase due to a need for a reduction in the cross-sectional area of the windings and an increase in the overall length of the windings. The increased copper loss lowers the efficiency of the dual-winding induction generator 2 and increases the temperature of the dual-winding induction generator 2. As a result, it is necessary to increase the size of the dual-winding induction generator 2 and to use expensive materials that the dual-winding induction generator 2 is made of, in order to prevent the efficiency from dropping and the temperature from rising.

Reducing the gap between a stator and a rotor of the dual-winding induction generator 2 is effective to increase the self-inductance value $L_{MainMax}$ of the main winding side of the dual-winding induction generator 2 under the condition of the generated power frequency being equal to $f_{Max}$ and the voltage applied to the main winding being equal to $V_{MainMax}$. However, the reduced gap tends to cause an increase in the vibrations and noises of the dual-winding induction generator 2.

Because an upper limit is imposed on the self-inductance value $L_{MainMax}$ according to the equation 51, the dual-winding induction generator 2 is prevented from requiring excessively high inductance specifications.

CONCLUSIONS

According to the present embodiment, the self-inductance value $L_{MainMax}$ of the main winding side under the condition of the generated power frequency of the dual-winding induction generator 2 being equal to $f_{Max}$ and the voltage applied to the main winding thereof being equal to $V_{MainMax}$ is smaller than

[Formula 53]

$$\frac{V_{mainMin}^2}{\pi f_{Min} P_{AuxMax}}$$

and larger than

[Formula 54]

$$\frac{V_{MainMin}^2}{\pi K_s f_{Min} P_{AuxMax}}$$

According to the present embodiment configured as described above, the dual-winding induction generator 2 is prevented from requiring excessively high inductance specifications, by imposing an upper limit on the self-inductance value $L_{MainMax}$.

Fourth Embodiment

A drive system according to a fourth embodiment of the present invention will be described as a drive system incorporated in an electric vehicle as an electrically driven vehicle.

Figure 8:
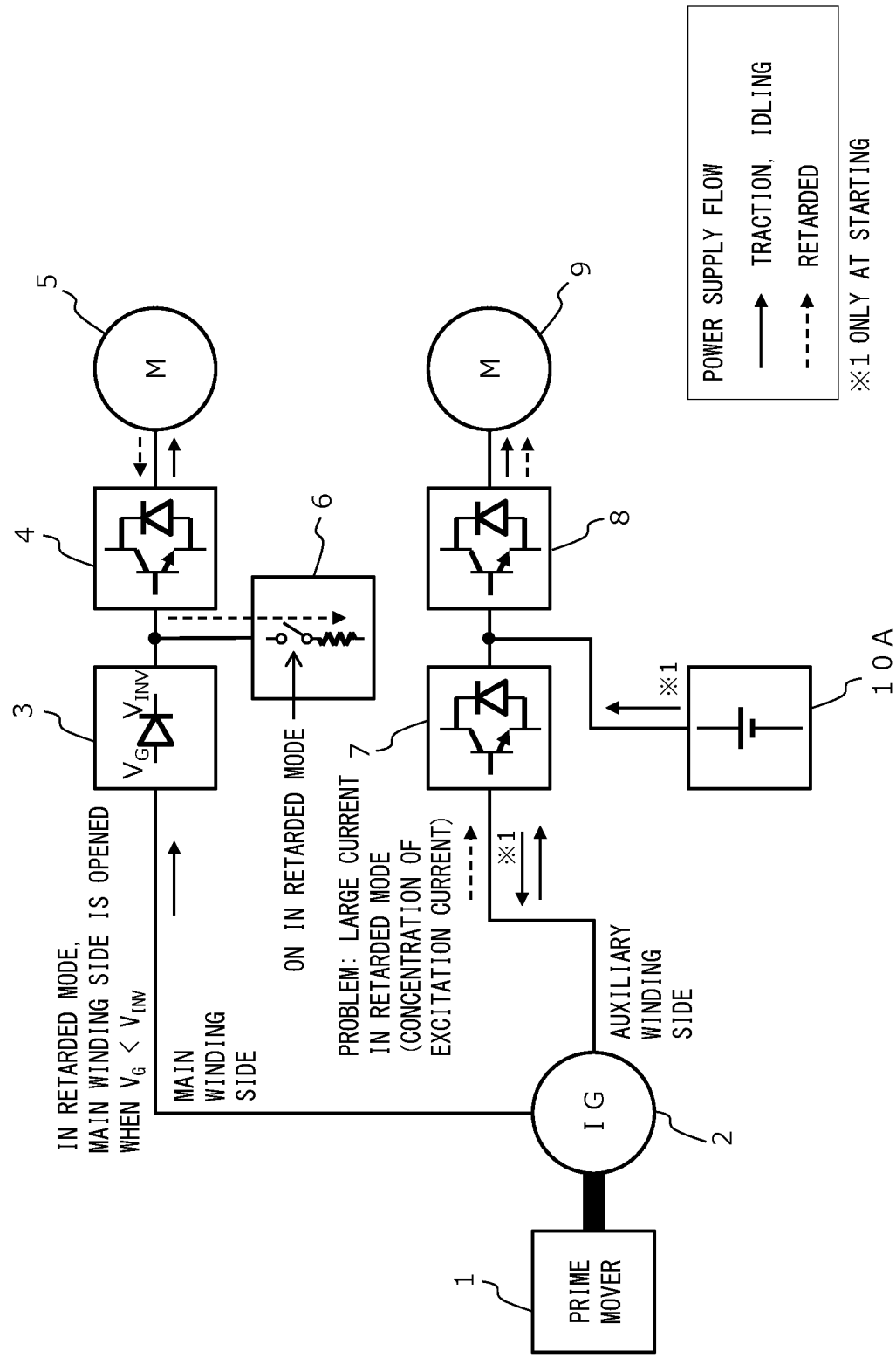
FIG. 8 is a diagram of a configuration of the drive system incorporated in an electric vehicle.

FIG. 8 is a diagram of a configuration of the drive system according to the present embodiment. As illustrated in FIG. 8, the prevent embodiment is different from the first embodiment (shown in FIG. 1) as to the way in which a starter battery 10A is connected. The starter battery 10 according to the first embodiment is connected to the terminal for direct current of the converter 7 for power generating and the terminal for direct current of the auxiliary inverter 8 only when the dual-winding induction generator 2 is being started. However, the starter battery 10A according to the present embodiment is connected at all times to the terminal for direct current of the converter 7 for power generating and the terminal for direct current of the auxiliary inverter 8.

Auxiliary systems of electric vehicles are generally 12 to 42 V systems, and batteries having the same voltages as the auxiliary systems are mounted on the vehicle bodies. By using such a battery as a starter battery 10', the voltage of the starter battery 10' is the same as the auxiliary system, allowing the starter battery 10' to be connected at all times to the converter 7 for power generating and the auxiliary inverter 8.

CONCLUSIONS

According to the present embodiment configured as described above, in the drive system incorporated in the electric vehicle, it is possible to supply the electric power required by the auxiliary inverter 8, even in the regenerative mode of operation in which only the auxiliary winding side is energized, as with the first embodiment.

Further, according to the present embodiment, the starter battery 10A is connected at all times to the terminal for direct current of the converter 7 for power generating and the terminal for direct current of the auxiliary inverter 8 and has the same voltage as the voltage at the terminal for direct current of the auxiliary inverter 8. The starter battery 10A thus has its connections not required to be switched, resulting in a reduction in the cost of switching devices and an electric loss. In addition, it is possible for the dual-winding induction generator 2 to charge the starter battery 10A while supplying electric power to the auxiliary inverter 8.

Although the embodiments of the present invention have been described in detail above, the present invention is not limited to the above-described embodiments and covers various modifications. For example, the above embodiments have been described in detail for an easier understanding of the present invention, and are not necessarily be limited to configurations including all the details described above. Moreover, it is possible to add some of the details of certain embodiments to the details of other embodiments, and to delete some of the details of certain embodiments or replace some of the details of certain embodiments with some of the details of other embodiments.

DESCRIPTION OF REFERENCE CHARACTERS

1: Prime mover
2: Dual-winding induction generator
3: Rectifier
4: Traction inverter
5: Traction motor
6: Regenerative resistor
7: Converter for power generating
8: Auxiliary inverter
9: Auxiliary motor
10, 10A: Starter battery

The invention claimed is:
1. A drive system comprising:
an induction generator having some primary windings that has a main winding and an auxiliary winding;
a traction inverter for supplying electric power to a traction motor;
an auxiliary inverter for supplying electric power to an auxiliary motor;
a rectifier having a terminal for alternating current connected to the main winding and a terminal for direct current connected to the traction inverter; and
a converter for power generating having a terminal for alternating current connected to the auxiliary winding and a terminal for direct current connected to the auxiliary inverter,
wherein a maximum current value of the converter for power generating is set on a basis of a maximum output power of the auxiliary winding and a minimum voltage applied to the auxiliary winding unless the traction inverter is in a regenerative mode of operation, and
a non-load current value of the induction generator is set such that a maximum current in the auxiliary winding under the condition of the traction inverter being in the regenerative mode of operation does not exceed a maximum current in the converter for power generating.
2. The drive system according to claim 1,
wherein an excitation current with respect to a rated current in the main winding is equal to or less than

[Formula 1]

$$0.5 \, K_s \frac{P_{AuxMax}}{S_{Main}} \frac{f_{Min}}{f_{Max}} \left(\frac{V_{MainMax}}{V_{MainMax}}\right)^2$$

where a maximum voltage applied to the main winding is indicated by $V_{MainMax}$,
a minimum voltage applied to the main winding is indicated by $V_{MainMin}$, a maximum frequency of the induction generator under the situation of the traction inverter being in the regenerative mode of operation is indicated by $f_{Max}$, a minimum frequency of the induction generator under the situation of the traction inverter being in the regenerative mode of operation is indicated by $f_{Min}$, a power generating capacity of the main winding is indicated by $S_{Main}$, the maximum output power of the auxiliary winding is indicated by $P_{AuxMax}$, and a saturation coefficient as a ratio of a self-inductance value of the main winding under the condition of a minimum value of a current in the auxiliary winding becoming maximum under the condition of the traction inverter being in the regenerative mode of operation with respect to the self-inductance value of the main winding under the condition of the generated power frequency of the induction generator being equal to $f_{Max}$ and a voltage applied to the main winding being equal to $V_{MainMax}$ is indicated by $K_s$.

3. The drive system according to claim 2, wherein the self-inductance value of the main winding is smaller than

[Formula 2]

$$\frac{V_{MainMin}^2}{\pi f_{Min} P_{AuxMax}}$$

and larger than

[Formula 3]

$$\frac{V_{MainMin}^2}{\pi K_s f_{Min} P_{AuxMax}}$$

where the generated power frequency of the induction generator is equal to $f_{Max}$ and the voltage applied to the main winding thereof is equal to $V_{MainMax}$.

4. The drive system according to claim 2, wherein the saturation coefficient is set on a basis of a relation between voltages and currents obtained by a non-load test on the induction generator.

5. An electrically driven dump truck comprising:
the drive system according to claim 1.

6. An electrically driven vehicle comprising:
the drive system according to claim 1.

7. The electrically driven vehicle according to claim 6, comprising:

a starter battery connected at all times to the terminal for direct current of the converter for power generating and a terminal for direct current of the auxiliary inverter, wherein the starter battery has a same voltage as a voltage at the terminal for direct current of the auxiliary inverter.

* * * * *